United States Patent [19]
Aguirre, Sr.

[11] Patent Number: 5,262,599
[45] Date of Patent: Nov. 16, 1993

[54] BRAKE ROTOR SILENCER APPARATUS

[76] Inventor: Tom L. Aguirre, Sr., 2403 Ben Ficklin Rd., San Angelo, Tex. 76903-8806

[21] Appl. No.: 900,652

[22] Filed: Jun. 19, 1992

[51] Int. Cl.⁵ .............................................. F16F 15/00
[52] U.S. Cl. .................................... 181/207; 181/208; 188/218 A; 188/268; 74/574
[58] Field of Search ............... 181/207, 208, 209, 211, 181/202, 205; 188/218 A, 268; 74/574

[56] References Cited

U.S. PATENT DOCUMENTS 3,774,472 11/1973 Mitchell ................................ 74/574
4,095,485 6/1978 Hiersig .................................. 74/574
4,678,066 7/1987 Heintz ............................. 188/218 A Primary Examiner—Michael L. Gellner
Assistant Examiner—Khanh Dang
Attorney, Agent, or Firm—Leon Gilden

[57] ABSTRACT

An elongate chain member having first and second ends is arranged for biased securement relative to the first and second ends for mounting peripherally about a brake rotor during a training procedure to dampen vibrations and audible noise. The invention is arranged to further include vibration dampener blocks within individual links of the chain member.

1 Claim, 4 Drawing Sheets

BRAKE ROTOR SILENCER APPARATUS

BACKGROUND OF THE INVENTION

1. Field of the Invention

The field of invention relates to brake rotor turning apparatus, and more particularly pertains to a new and improved brake rotor silencer apparatus arranged for securement about a brake rotor to dampen vibration and noise resultant from a turning procedure.

2. Description of the Prior Art

Typically during resurfacing of a brake rotor, accumulative effect of such noise and vibration has a negative impact upon an individual implementing the turning procedure, as well as chaffing of the brake rotor resultant from vibration during the turning procedure. The instant invention attempts to overcome deficiencies of the prior art by providing for a silencer apparatus arranged for peripheral mounting about the brake rotor to dampen vibration and resultant noises during the procedure and in this respect, the present invention substantially fulfills this need.

SUMMARY OF THE INVENTION

In view of the foregoing disadvantages inherent in the known types of turning apparatus now present in the prior art, the present invention provides a brake rotor silencer apparatus wherein the same is arranged for mounting about a brake rotor during a turning procedure. As such, the general purpose of the present invention, which will be described subsequently in greater detail, is to provide a new and improved brake rotor silencer apparatus which has all the advantages of the prior art brake turning apparatus and none of the disadvantages.

To attain this, the present invention provides an elongate chain member having first and second ends arranged for biased securement relative to the first and second ends for mounting peripherally about a brake rotor during a training procedure to dampen vibrations and audible noise. The invention is arranged to further include vibration dampener blocks within individual links of the chain member.

My invention resides not in any one of these features per se, but rather in the particular combination of all of them herein disclosed and claimed and it is distinguished from the prior art in this particular combination of all of its structures for the functions specified.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. Those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved brake rotor silencer apparatus which has all the advantages of the prior art brake turning apparatus and none of the disadvantages.

It is another object of the present invention to provide a new and improved brake rotor silencer apparatus which may be easily and efficiently manufactured and marketed.

It is a further object of the present invention to provide a new and improved brake rotor silencer apparatus which is of a durable and reliable construction.

An even further object of the present invention is to provide a new and improved brake rotor silencer apparatus which is susceptible of a low cost of manufacture with regard to both materials and labor, and which accordingly is then susceptible of low prices of sale to the consuming public, thereby making such brake rotor silencer apparatus economically available to the buying public.

Still yet another object of the present invention is to provide a new and improved brake rotor silencer apparatus which provides in the apparatuses and methods of the prior art some of the advantages thereof, while simultaneously overcoming some of the disadvantages normally associated therewith.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
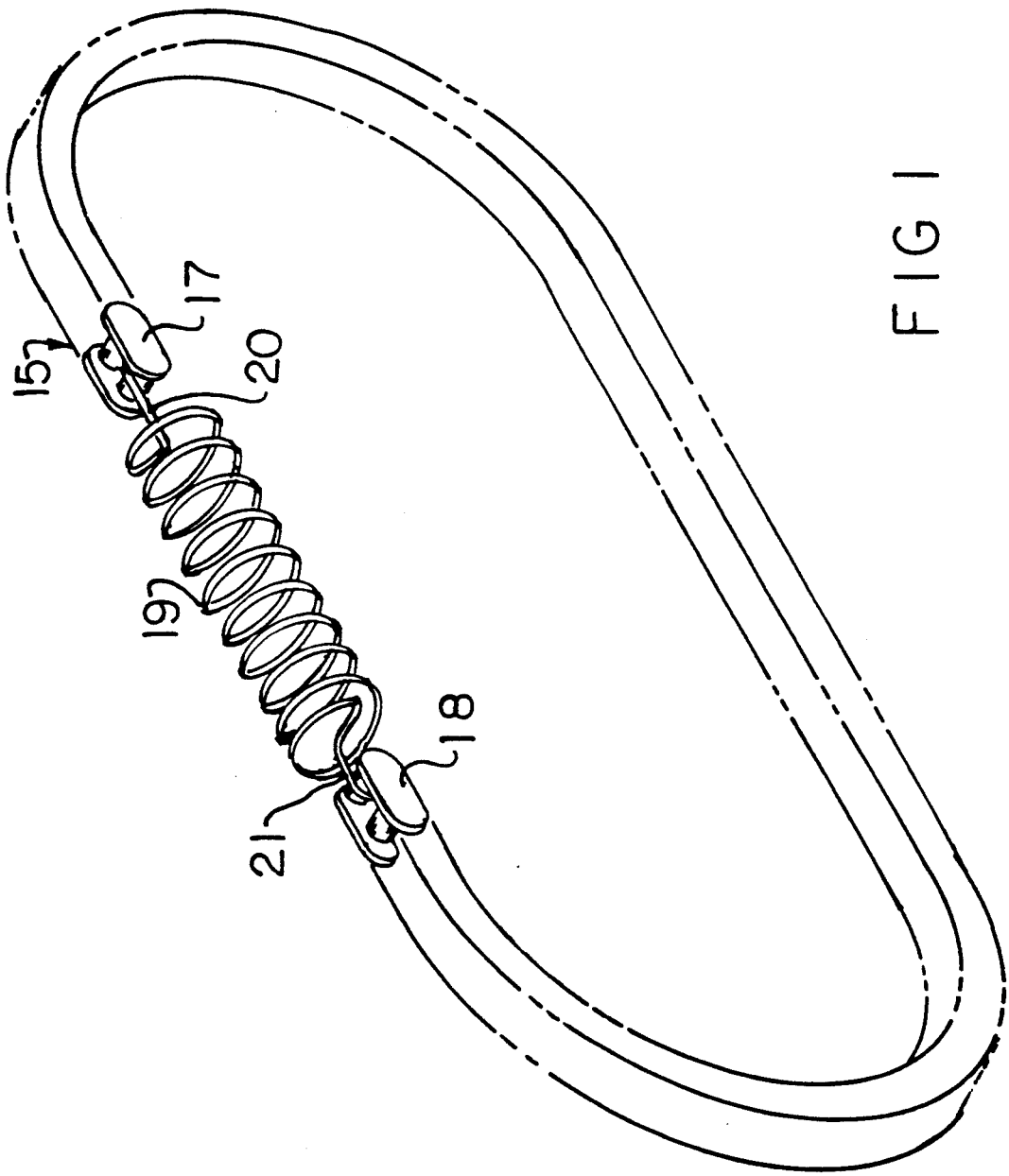
FIG. 1 is an isometric illustration of the silencer apparatus of the invention.
Figure 2:
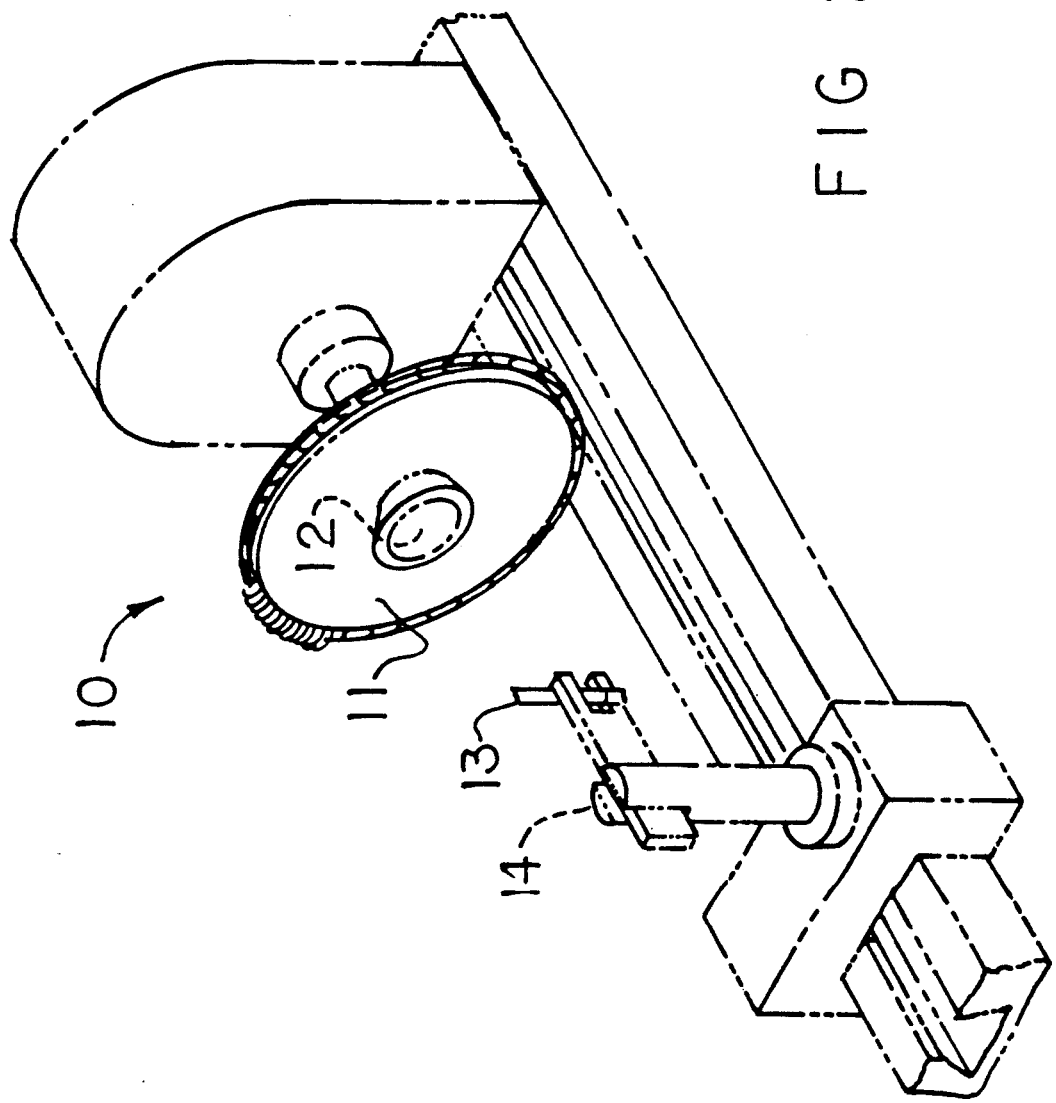
FIG. 2 is an isometric illustration of the invention in a turning environment.
Figure 3:
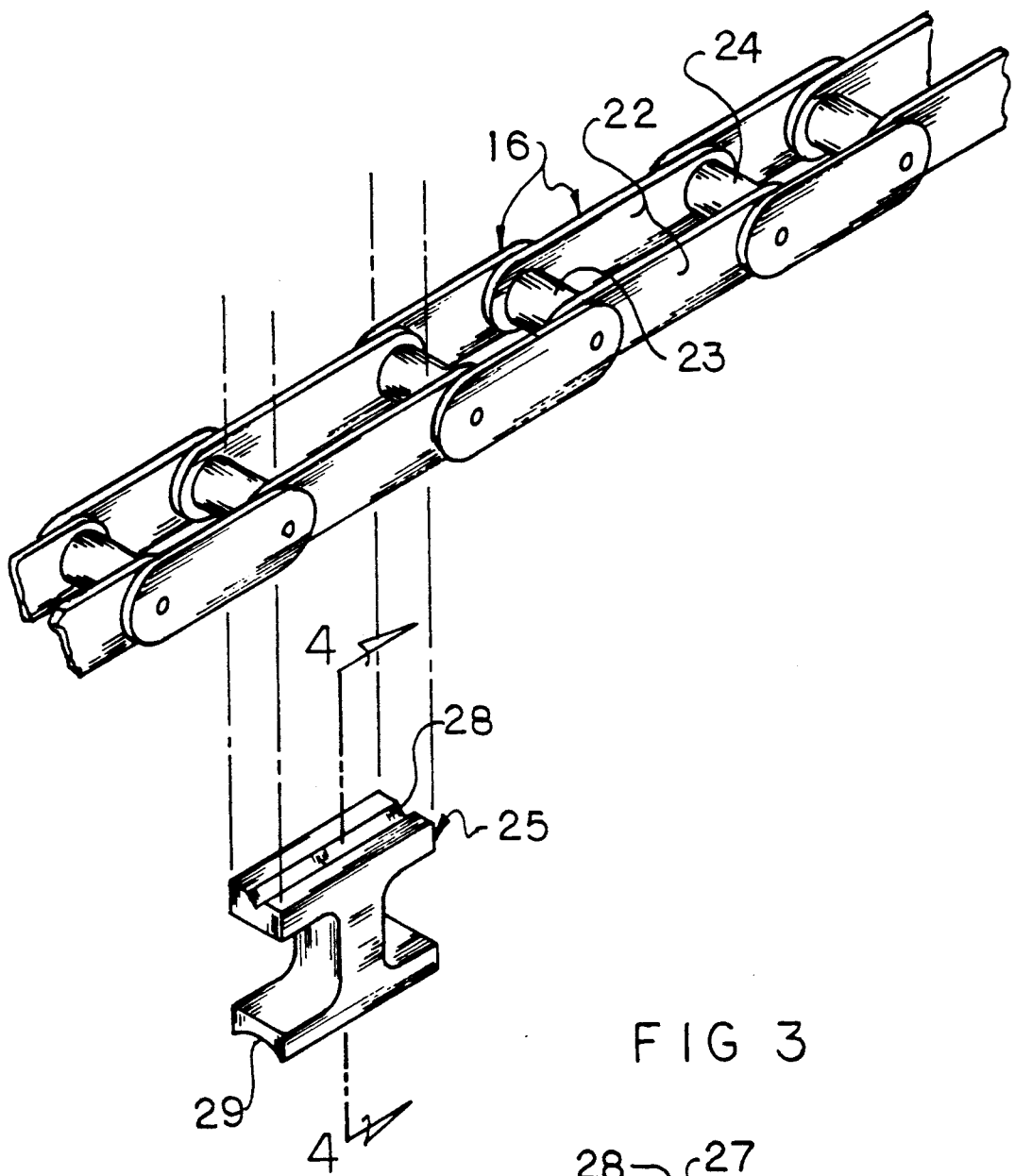
FIG. 3 is an isometric illustration of the invention utilizing silencer blocks mounted within the chain links.
Figure 4:
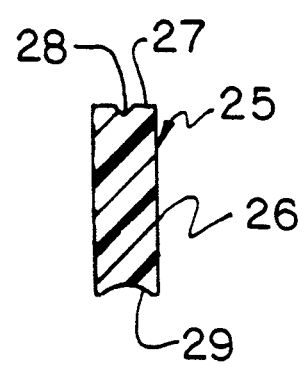
FIG. 4 is an orthographic view, taken along the lines 4—4 of FIG. 3 in the direction indicated by the arrows.
Figure 7:
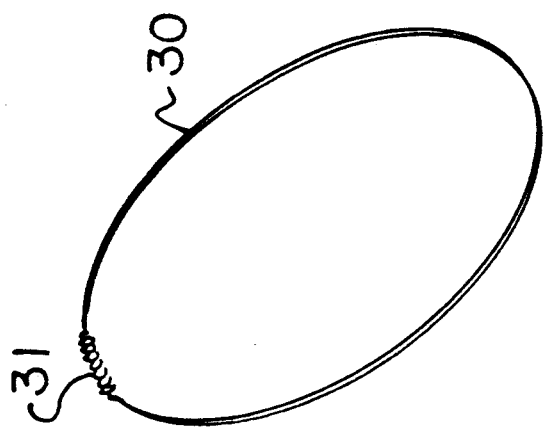
FIG. 7 is an isometric illustration of the securement band utilized by the apparatus illustrated in FIG. 5.
Figure 6:
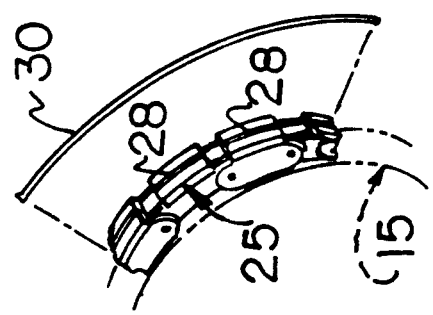
FIG. 6 is an enlarged isometric view of section 6 set forth in FIG. 5.
Figure 5:
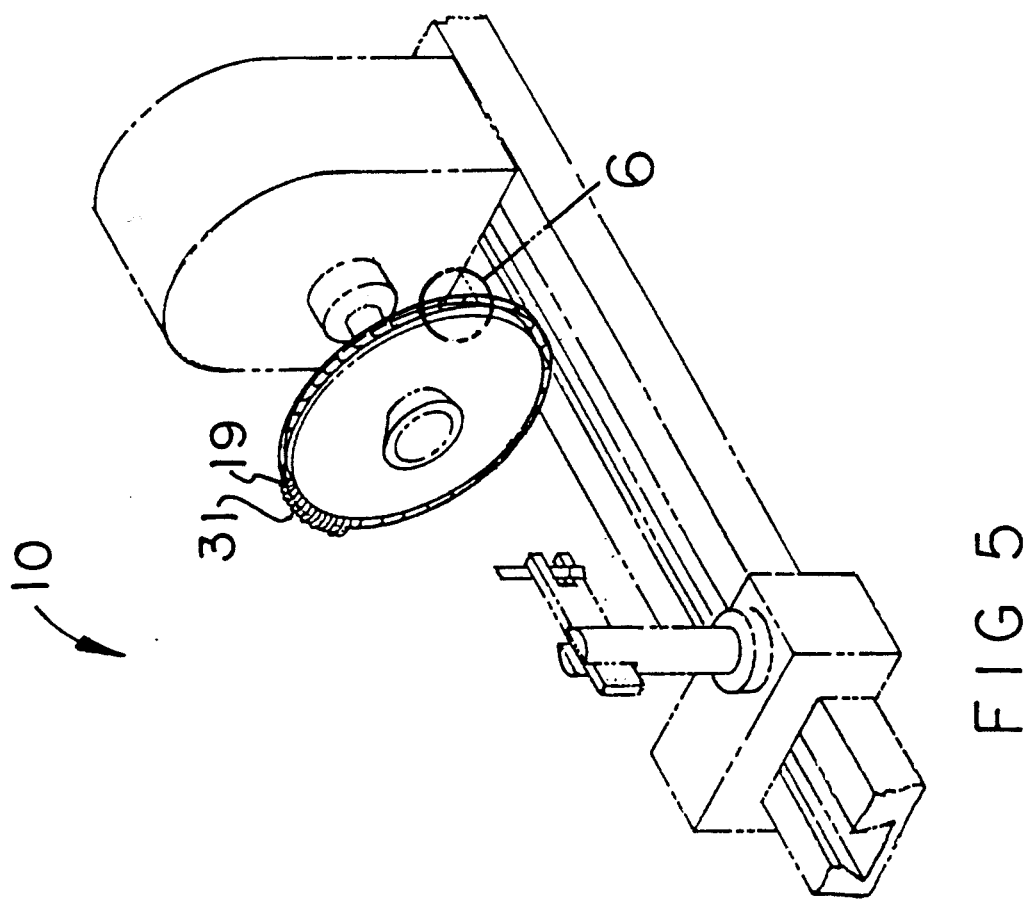
FIG. 5 is an isometric illustration of the turning apparatus utilizing silencer blocks.

With reference now to the drawings, and in particular to FIGS. 1 to 7 thereof, a new and improved brake rotor silencer apparatus embodying the principles and concepts of the present invention and generally designated by the reference numeral 10 will be described.

More specifically, the brake rotor silencer apparatus 10 of the instant invention essentially comprises a brake rotor 11 mounted to a turning spindle 12 having a surfacing tool 13 secured to a tool holder 14, with the tool holder 14 arranged for reciprocation relative to the turning spindle and the brake rotor to effect a brake rotor. A chain member 15 has a plurality of chain member links 16 mounted between a first end link 17 and a second end link 18. A chain tensioning coil spring 19 having a spring first end 20 and a spring second end 21 is secured respectively to the first end link 17 and the second end link 18. Each of the links includes parallel side plates 22 positioned between a forward link roller 23 and a rear link roller 24 orthogonally oriented relative to the side plates 22. In use, the chain member 15 and the associated chain tensioning spring 19 are secured peripherally about the brake rotor 11 during a turning procedure.

As indicated in the FIGS. 3-7, the apparatus further includes a plurality of silencer blocks, with a single silencer block 25 mounted within adjacent side plates of each link 16 and if desired, within the end links 17 and 18. The silencer blocks are arranged coextensively between adjacent side walls 26, with each silencer block 25 having a block top wall 27 having a top wall groove 28 that is arranged parallel and medially of the side plates 22. Each silencer block 25 further is provided within an arcuate bottom wall 29 for positioning and enhanced mounting of the organization to the periphery of the brake rotor 11. A flexible securement band 30 includes a band tensioning coil spring secured to opposed ends of the flexible securement band, with the band turning coil spring interwoven with the chain tensioning coil spring 19 and the band positioned and secured within the top wall groove 28 of each silencer block 25. In this manner, enhanced vibrational silencing of the brake rotor turning is effected.

As to the manner of usage and operation of the instant invention, the same should be apparent from the above disclosure, and accordingly no further discussion relative to the manner of usage and operation of the instant invention shall be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by LETTERS PATENT of the United States is as follows:

1. A brake rotor silencer apparatus for securement about a brake rotor, with the brake rotor mounted upon a turning spindle having a surfacing tool arranged for cooperation with the turning spindle, wherein the apparatus comprises, a chain member, the chain member including a plurality of chain links, and the chain links including a first end link at a first end of the chain member, and a second end link at a second end of the chain member, with the chain links positioned coextensively between the first end link and the second end link, and a tensioning coil spring having a coil spring first end and a coil spring second end, with the coil spring first end mounted to the first end link and the coil spring second end mounted tot he second end link, and each of the links includes parallel side plates, and each link further includes a forward link roller and a rear link roller orthogonally oriented relative to the side plates in a spaced parallel relationship, and a silencer bock formed of resilient polymeric material mounted between the side plates of each link and each silencer block includes a silencer block top wall having a top wall groove and a silencer block arcuate bottom wall arranged for positioning upon the brake rotor outer periphery, and a flexible securement band, the flexible securement band positioned within each top wall groove of each silencer block, and the flexible securement band having a band first end and a band second end, with a band tensioning coil spring mounted to the band first end and the band second end, with the band tensioning coil spring interwoven with the chain tensioning coil spring.

* * * * *